Sept. 7, 1965
L. L. KLEINBERG
3,205,348
QUOTIENT CIRCUIT
Filed Sept. 28, 1961
3 Sheets-Sheet 1
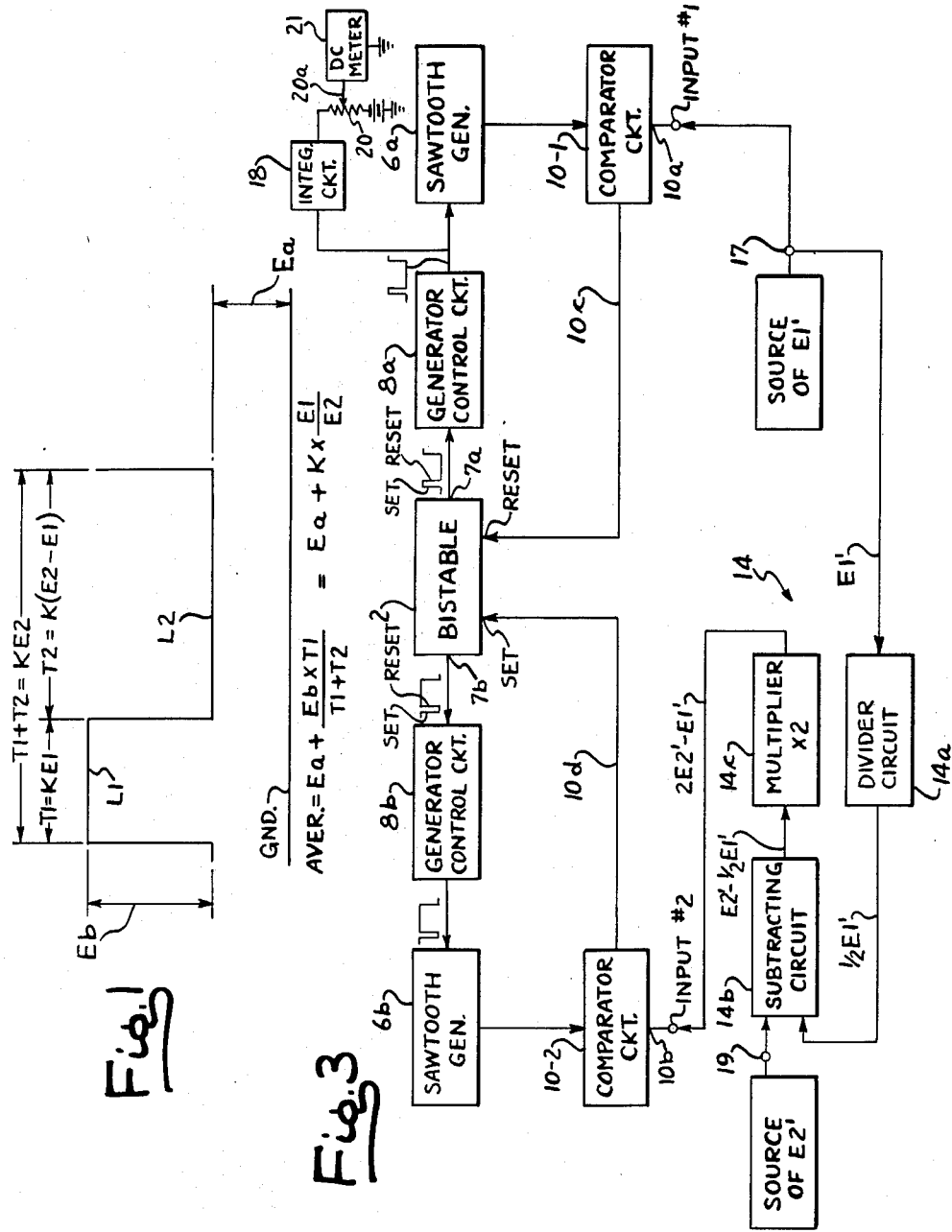
INVENTOR.
LEONARD L. KLEINBERG
BY
ATTYS.

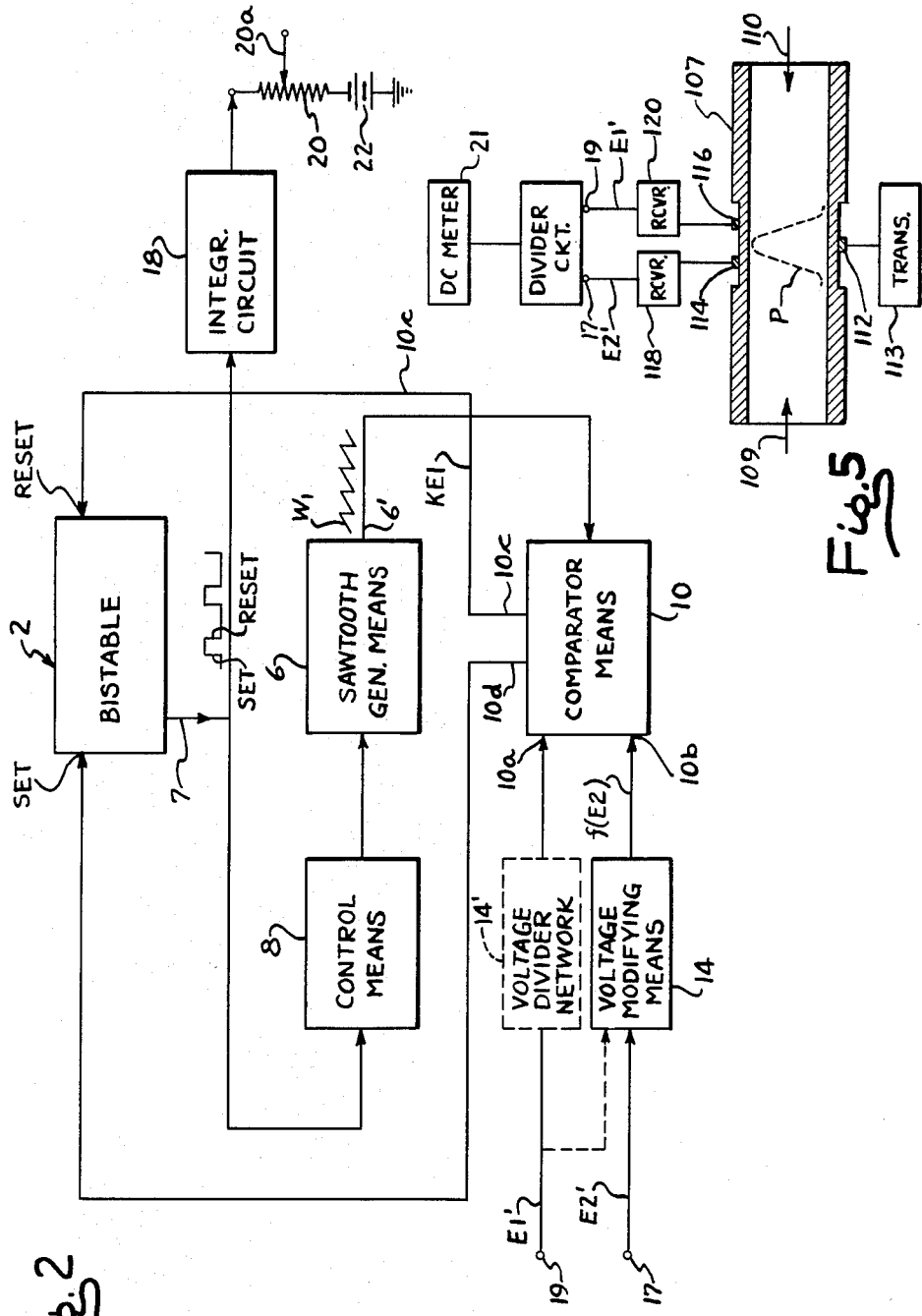

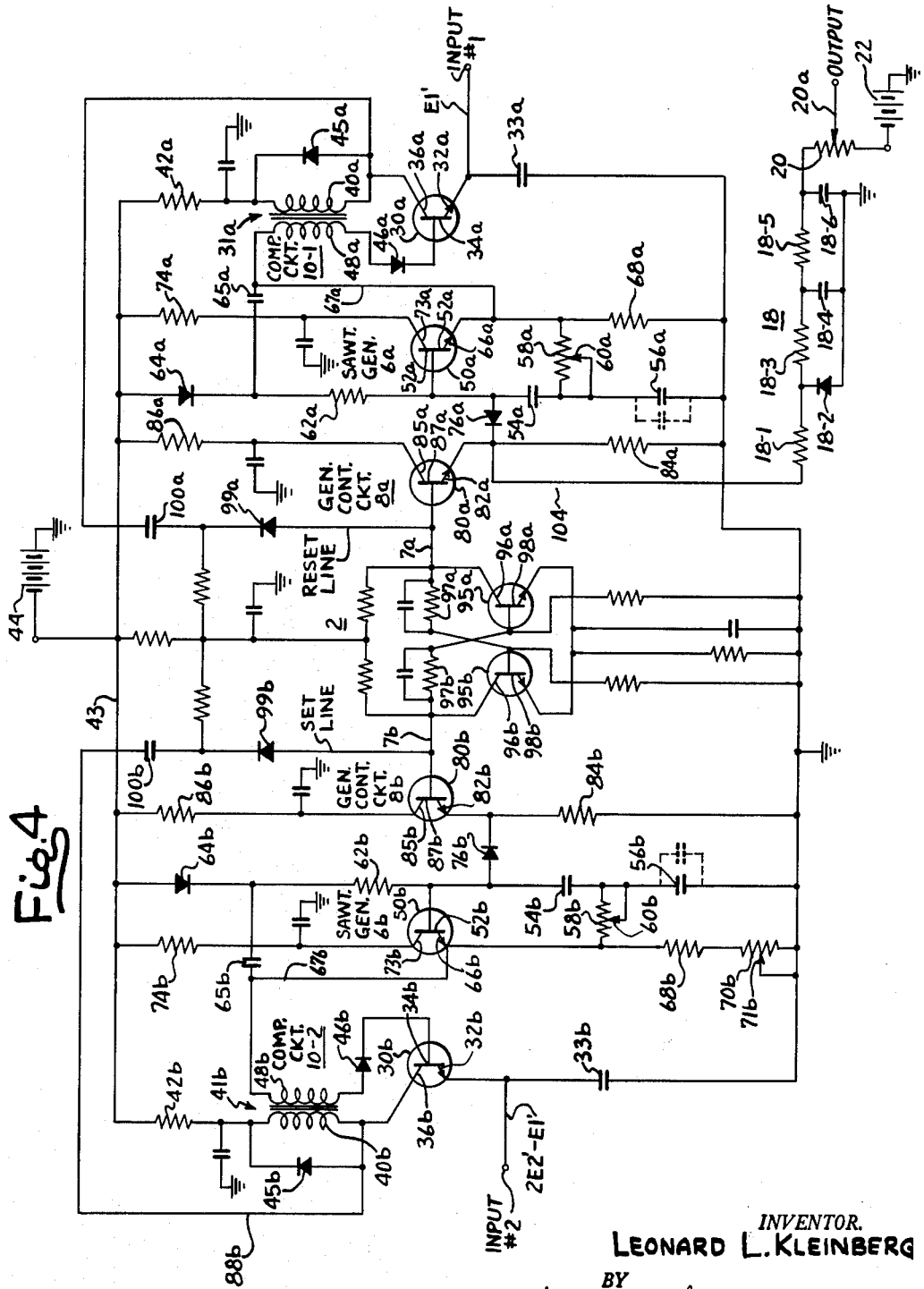

United States Patent Office 3,205,348
Patented Sept. 7, 1965

3,205,348
QUOTIENT CIRCUIT
Leonard L. Kleinberg, Fords, N.J., assignor to Gulton Industries, Inc., Metuchen, N.J., a corporation of New Jersey
Filed Sept. 28, 1961, Ser. No. 141,347
7 Claims. (Cl. 235—196)

This invention relates to a circuit for dividing one direct current voltage by another.

Numerous circuits have been heretofore developed for dividing one direct current voltage by another, but these circuits have many limitations due to their complexity, degree of accuracy, or, in some instances, their inability to provide usable results when the voltages involved have comparable magnitudes or where one of the voltages may have values greater or less than the other.

One application involving the latter problem is in the sonic beam deflection-type flowmeter disclosed in co-pending application Serial No. 141,506 of Walter Welkowitz entitled "Sonic Flowmeter." This flowmeter operates on the principle of sensing the deflection of a generally bell-shaped sonic beam generated transversely of the axis of a conduit carrying the fluid stream to be measured by a transmitting transducer mounted on the outside of the conduit. A pair of receiving transducers are mounted on the outside of the conduit at positions spaced slightly longitudinally of and on opposite sides of the transmitting transducer to sense opposite linearly decreasing portions of the transmitted beam pattern located on opposite sides of the beam maximum point. The presence of fluid flow in one direction will deflect the beam downstream in an amount proportional to the fluid velocity and so results in an increase in response at one of the receiving transducers and a decrease in response at the other of same. If the fluid flows in the opposite direction, the relative responses sensed by the receiving transducers will reverse from that just described. It has been discovered that an exceptionally stable and accurate measurement of fluid flow rate is obtained by dividing the rectified and filtered outputs of the two receiving transducers. The present invention has particular utility as a divider circuit in this environment since it provides an accurate measure of the ratio of two direct current voltages where one of the voltages can be greater or less than the other voltage and the relative magnitudes of the voltages is indicated by the polarity of resultant output voltage. Both the value and direction of fluid flow is thus given. The invention, however, has a more general application.

It is, accordingly, an object of the present invention to provide a very accurate, reliable and simple means for dividing one direct current voltage by another. A further object of the invention is to provide a quotient circuit as just described wherein one of the voltages may be either greater or less in magnitude than the other of same and wherein these two conditions are sensed by the polarity of the output of the quotient circuit. The present invention operates on the principle that the average value of a square wave voltage waveform varying between two levels having the same polarity (or wherein one of the levels is zero) is a function of the ratio of the smaller voltage to the larger voltage when the higher voltage level is maintained for a period proportional to the smaller of the two voltages involved and the lower voltage level is maintained for a period proportional to the difference between the voltages. The latter requirement is the same as stating that the period of each square wave cycle is proportional to the magnitude of the larger of the two voltages to be divided. This result is electrically accomplished by means including a bistable circuit which in one of its state of operation provides the aforementioned higher voltage level and in its other state of operation provides the aforementioned lower or zero voltage level. The circuit further includes sawtooth wave generating means for generating a substantially linear sawtooth voltage waveform which progressively increases in magnitude. Control means are provided for synchronizing the sawtooth wave generating means with the operation of the bistable means so that at least one sawtooth waveform is generated which effectively increases from zero beginning with the triggering of the bistable circuit to its higher voltage state of operation, to be sometimes referred to as the set state of operation.

Comparison means is provided which compares the smaller of the input voltages with the aforesaid output of the sawtooth wave generating means, and when a given state of comparison exists between these two voltages the bistable circuit is reset so that the duration of the higher votlage level output signal thereof is directly proportional to the magnitude of the smaller of said voltages. The duration of the lower level output condition of the bistable circuit which, as above explained, is to be proportional to the difference between the larger and smaller input voltages, can be accomplished in a number of ways. One approach is to control the overall period between the successive settings of the bistable circuit by a comparison operation of a type similar to that described. In the form of the invention to be disclosed in this application, a direct current voltage is derived which is proportional to the difference between the two input voltages involved and this voltage is compared with a second output of the sawtooth wave generating means which is recycled as the bistable circuit is reset. The bistable circuit is set when a given state of comparison exists between the latter two voltages.

Other aspects of the invention add a means for modifying the voltages to be divided before being fed to the divider circuit for comparison with the output or outputs of the sawtooth wave generating means, so that the system can handle input voltages of comparable magnitude and where either voltage may be greater than the other. The relative magnitudes of the input voltages is indicated by the polarity of the output voltage. The voltage modifying means provides a modified input voltage which is always substantially smaller or greater than the other input voltage. If the input voltages applied to the divider circuit were of the same magnitude, the duration time required for the low level portion of the output of the bistable circuit (which is proportional to the difference between two comparable magnitudes) would be near zero. This is an impractical situation since it takes a finite time to reset and then set a bistable circuit.

Other objects, advantages and features of the present invention will become apparent upon making reference to the specification to follow, the claims and the drawings wherein:

FIG. 1 shows a square waveform with upper and lower amplitude levels persisting for designated intervals of time related to the input voltages to be divided in a manner which illustrates the operation of the present invention;

FIG. 2 is a box diagram of a generalized form of the present invention;

FIG. 3 is a block diagram of one exemplary form of the present invention;

FIG. 4 illustrates an exemplary circuit which may be utilized to carry out the functions of some of the boxes shown in FIG. 3; and FIG. 5 illustrates the flowmeter application of the invention.

Referring now to FIG. 1, there is there shown a single cycle of a square wave having an upper level L1 at a voltage $Ea+Eb$ and a lower level L2 at a voltage $Ea$, the two voltages both being above ground or other reference voltage level. The average value of the single cycle of the voltage waveform shown is given by the equation:

$$E \text{ aver.} = Ea + Eb \times T1\lambda(T1+T2)$$

where T1 is the time duration at which the voltage is at the upper level, L1 and T2 is the time duration during which the voltage is at the lower lever L2. Where the period T1 is proportional to the input voltage E1, and the total period $T1+T2$ is proportional to a second input voltage E2, the above equation becomes:

$$E \text{ aver.} = Ea + KE1/E2$$

where K is a constant. It should be further noted that the time period T2 is proportional to the quantity $$K(E2-E1)$$

It is thus apparent that if the input voltages E1 and E2 were of comparable magnitude that the time period T2 would become insignificantly small. Also, the equation would have validity and meaning only if the voltage E2 is greater than the voltage E1.

Refer now to the box diagram of FIG. 2 which illustrates a generalized form of the present invention which computes a quantity proportional to the ratio $E1/E2$ and wherein one of the input voltages E1′ may be greater than or less than the other input voltage E2′, and wherein a voltage output is provided whose polarity indicates which of the quantities E1′ and E2′ is greater than the other.

The circuit in FIG. 2 includes a square wave generator circuit preferably in the form of a bistable unit 2 which can assume one of two possible states, one being referred to as a set state where a relatively high voltage level representing the level L1 appears at an output 7 and the other being referred to as a reset state where a relatively low voltage level representing the level L2 appears at output 7. The low level L2 could be zero or a finite level of the same polarity as the level L1. The upper and lower levels of the output thereof are controlled by the feeding of properly timed set and reset pulses to a pair of inputs thereof respectively identified as set and reset inputs in FIG. 2.

The circuit further includes sawtooth generator means 6 which provides at an output 6′ thereof the waveform W1 having a linearly progressively increasing wave front which preferably terminates in a steep trailing edge. The operation of the sawtooth generator means 6 is controlled by control means 8 which in turn receives control signals from the bistable circuit 2.

Depending upon the particular embodiment of the invention, the sawtooth generator means 6 may comprise a single sawtooth generator circuit producing a sawtooth waveform lasting for the full period $T1+T2$ (see FIG. 1) and beginning at approximately the instant the bistable circuit is set, or it may comprise separate sawtooth generators which respectively provide sawtooth waveforms which are initiated at the times the bistable circuit 2 is set and reset. The single or double outputs of the sawtooth generator means 6 is fed to comparator means 10 which may be one or a pair of comparator circuits. In the case where a single sawtooth waveform is utilized, the comparator means 10 will comprise a single comparator circuit which compares the sawtooth waveform output of the sawtooth generator means 6 with voltages E1 and E2 fed to a pair of inputs 10a and 10b thereof. In the case where the sawtooth generator means 6 produces two separate sawtooth waveforms respectively initiated at the times the bistable circuit 2 is set and reset, separate comparison circuits are provided which are each responsive to one of the sawtooth waveforms and the voltage E1 or $KE2-E1$.

The comparator means or circuits 10 control the timing of the setting and resetting of the bistable 2 in accordance with the comparison between the sawtooth waveform or waveforms and the voltages E1 and E2 or functions thereof. The comparator means 10 has an output line 10c at which a reset pulse appears when a given state of comparison exists between the sawtooth waveform synchronized with the setting of the bistable circuit and the voltage E1. This reset pulse is fed to the reset input of the bistable circuit 2 to reset the same so that a voltage level L1 will appear at the bistable circuit output 7 for a time duration T1 proportional to the voltage E1.

The manner in which the bistable circuit 2 is set varies in accordance with the particular form of the sawtooth generator means 6 utilized as briefly referred to above. Thus, as above indicated, the duration of the lower level L2 or reset condition of the output of the bistable circuit 2 can be controlled by either making the overall period $T1+T2$ of the square wave output thereof proportional to the other voltage E2, or the duration T2 of the square wave output proportional to the difference between the voltages E2 and E1. In the former procedure, the voltage input applied to the comparator input 10b will be directly proportional to the voltage E2 whereas in the latter procedure the voltage fed to the comparator input 10b is a function of the difference between the voltages E2 and E1. (The box diagram of FIG. 3 to be described in more detail later on in the specification is a more detailed box diagram illustrating the circuit which controls the bistable circuit 2 in accordance with the latter procedure.) In either event, the comparator means 10 has a set output line 10d extending to the set input of the bistable circuit 2. A pulse will appear on this line whenever a given state of comparison exists between an output of the sawtooth generator means 6 and the voltage fed to the comparison circuit input 10b. In the former procedure where one sawtooth waveform is generated per cycle starting with the setting of the bistable circuit 2, a set pulse is generated when a given state of comparison exists between the sawtooth waveform and the voltage E2 which set pulse is fed by a line 10d of the comparison means to the set input of the bistable circuit 2. The resulting change in output of the bistable circuit 2 will be fed to control means 8 which will initiate the generation of a new cycle of operation of the sawtooth generator means 6. In the procedure where the sawtooth generator 6 has two separate sawtooth wave outputs initiated respectively upon the setting and resetting of the bistable circiut 2, when a given state of comparison exists between the sawtooth waveform which starts at the resetting of the bistable circuit and the voltage proportional to the difference between the voltages E2 and E1, a set pulse will appear on the line 10d which will set the bistable circuit 2 which, in turn, terminates the latter sawtooth waveform which will start again upon the subsequent resetting of the bistable circuit.

Where the magnitudes of the main signal input voltages E1′ and E2′ are normally expected to be of comparable magnitudes, or where E1′ can be greater to or less than E2′, in accordance with another aspect of the invention, voltage modifying means 14 is inserted between an input terminal 17 to which the input voltage E2′ is applied and the comparator circuit input 10b. One of the functions of the voltage modifying means is to generate a factor $K_2E2'$ where $K_2$ is 2 or greater so that E1′ will always be smaller than $K_2E2'$. $K_2$ is preferably 2 so that when E1′ and E2′ are equal the upper and lower levels L1 and L2 of the output of the square wave generator circuit will occur for equal intervals.

Where the voltage 2E2′ is to indirectly control the period $T1+T2$, the voltage modifying means 14 provides the voltage function $2E2'-E1'$.

Alternatively, a voltage dividing network 14′ which provides a factor $E1'/2$ can be inserted between a terminal 19 to which input voltage E1′ is applied and the comparator input 10a. In such case the voltage modifying means 14 would be omitted where E2′ is to directly control the period $T1+T2$, or it would be modified to provide a factor $E2'-\frac{1}{2}E1'$ where the interval T2 is to be directly controlled.

The square wave output of the bistable circuit 2 is fed to the input of control means 8 which synchronizes the operation of the sawtooth generator means 6 so that the one or more sawtooth waveforms thereof start the time of setting or resetting of the bistable circuit. The output of bistable circuit is also fed to an integrator circuit 18 which provides a direct current voltage output proportional to the average of the square wave output of bistable circuit 2. The output of the integrator circuit 18 is shown extending to the upper terminal of a potentiometer 20 whose bottom terminal extends to a biasing voltage source 22. If the output of the integrator circuit 18 is a positive voltage, the lower end of the potentiometer 20 is connected to the negative terminal of the voltage source 22 whose opposite or positive terminal is grounded. The output of the circuit just described is taken between the wiper 20a of the potentiometer and ground. By adjusting the position of the wiper 20a of the potentiometer 20 it is apparent that a zero direct current output voltage can be obtained when the time durations T1 and T2 of the upper and lower levels L1 and L2 of the output of the bistable circuit 2 are equal indicating identity between the voltage inputs E1' and E2'. It can thus be seen that if the input voltage E1' becomes greater than the input voltage E2', that the output across the wiper 20a and ground will be a positive voltage and, conversely, when the voltage E2' is greater than the voltage E1', the output across the wiper 20a and ground will be a negative voltage.

As previously indicated, FIG. 3 illustrates the form of the invention wherein the sawtooth generator means 6 comprises separate sawtooth wave generator circuits 6a and 6b. The sawtooth generator control means 8 comprises separate circuits 8a and 8b respectively having inputs connected to separate outputs 7a and 7b of the bistable circuit at which appear square signals which are 180° out of phase. Thus, when the output at 7a is at the high voltage level L1 the output at 7b is at the lower level L2 and vice versa. The control circuits 8a and 8b are designated to initiate the generation of progressively increasing sawtooth waveforms by the associated sawtooth wave generator circuits when the voltage inputs thereto are at the higher voltage level L1 and to terminate the generation of the waveforms when the voltage inputs thereto are at the low voltage level L2. The sawtooth generator circuits 6a and 6b are thus alternately operative during the time periods T1 and T2 in FIG. 1.

The outputs of the sawtooth wave generator circuits 6a and 6b are respectively fed to one of the inputs of comparator circuits 10–1 and 10–2. The comparator circuits have second inputs to which the aforesaid voltages E1' and 2E2'—E1' are fed. When a given state of comparison exists between the output of the sawtooth generator 6a and the voltage E1', the comparator circuit 10–1 produces a reset pulse on reset line 10c which resets the bistable circuit 2 to terminate the relatively high voltage level condition which enabled the sawtooth generator 6a to operate. The sense of the voltages at the bistable circuit outputs 7a and 7b will then reverse so that the output at 7b will then be in a relatively high voltage state to initiate operation of the sawtooth generator 6b through the generator control circuit 8b. The sawtooth generator 6b has an output extending to the input of a comparison circuit 10–2. The comparison circuit 10–2 has another input at which a voltage appears which is given by the quantity:

$$E2'-\tfrac{1}{2}E1'$$

This voltage is obtained by means including a divider circuit 14a forming part of the voltage modifying means referred to in FIG. 2. The input of the divider circuit 14a extends from the E1 input voltage terminal 17. The output of the divider circuit 14a is a direct current voltage which is $\frac{1}{2}E1'$. This voltage is fed to the input of a subtracting circuit 14b having another input extending to the input terminal 19 to which the source of voltage E2' is applied. The output of the subtracting circuit 14b is a quantity:

$$E2'-\tfrac{1}{2}E1'$$

The output of the subtracting circuit 14b is fed to a multiplier circuit 14c which multiplies the input voltage by a factor of 2 thereby producing an output voltage given by the equation 2E2'—E1'. This voltage in turn is fed to the second mentioned input of a comparison circuit 10–2.

When a given state of comparison exists between the sawtooth input of the comparison circuit 10–2 and the input voltage 2E2'—E1', the pulse appears in the output of the comparison circuit which is fed to the set input of the bistable circuit 2 to set the same and thereby switch the bistable circuit into its initial state.

The output of the circuit which is a function of the ratio of the two input voltages may be taken directly from the output of the bistable circuit 2 or, as indicated in FIG. 3, may be taken from the output of the generator control circuit 8a which, in the present exemplary circuit to be described, is also a square wave output following the waveform of the output of the bistable circuit 2. This output is fed to an integrator circuit 18 which in turn has an output fed to the potentiometer 20 and direct current voltage supply 22 as previously described. A direct current meter capable of indicating voltages of both positive and negative polarity is connected to the wiper 20a of the potentiometer. Alternatively, the potentiometer could be fed to a chopper circuit where the direct current output is converted to an alternating current of one of two possible phases and an amplitude proportional to the amplitude of the output of the divider circuit. A phase responsive A.C. meter could then be used to indicate the ratio of the voltages involved.

Refer now to the circuit diagram of FIG. 4 which illustrates exemplary circuitry for that portion of the circuit of FIG. 3 which provides an output proportional to the ratio of the voltages E1' and 2E2'—E1'. The circuitry shown uses NPN type transistors throughout as current control devices.

The comparator circuits 10–1 and 10–2 to which the voltages E1' and 2E2'—E1' are respectively applied include transistors 30a and 30b having emitter electrodes 32a and 32b, base electrodes 34a and 34b and collector electrodes 36a and 36b. The electrodes of these transistors are connected into identical circuits, only one of which will be described in detail, the corresponding elements in the two circuits being similarly identified except that the alphabet characters a and b are respectively used in the comparator circuits 10–1 and 10–2 following the reference numerals therein. The input voltage E1' is applied across an input capacitor 33a having one end grounded and the other end connected to emitter electrode 32a. (The voltage 2E2'—E1' is applied across a corresponding capacitor 33b in circuit 10–2.) The collector electrode 36a is coupled through the winding 40a of a pulse transformer 41a and a resistor 42a to a common positive bus 43 leading to the positive terminal of a source of positive voltage 44. A damping diode 45a is connected in parallel with the winding 40a to damp out oscillations in the pulse transformer winding.

The base electrode 34a of the transistor 30a is coupled through a rectifier 46a (arranged to pass positive pulses to the transistor) to a winding 48a on the pulse transformer 41a inductively coupled to the aforementioned winding 40a. The winding 48a is connected in series with the positive sawtooth output of the sawtooth generator circuit 6a to be described.

The sawtooth generator circuits 6a and 6b are identical circuits and only a specific description of the sawtooth generator circuit 6a will be given. The corresponding elements of these circuits have been similarly numbered with the alphabet characters *a* and *b* again used to distinguish corresponding elements of the two circuits. The sawtooth generator circuit 6a includes a transistor 50a having a base electrode 52a connected through a capacitor 54a and a capacitor 56a to ground. One end of a potentiometer 58a is connected to the juncture between capacitors 54a and 56a and the wiper 60a thereof is connected to the latter end of the potentiometer. The other end of the potentiometer 58a is connected to the juncture between the emitter electrode 66a of the transistor 50a and a resistor 68a connected to ground. The movement of the wiper 60a varies the effective value of the capacitance between wiper 60a and ground and acts as a slope adjusting control for the voltage waveform developed across the series capacitor network comprising the capacitors 54a and 56a. The wipers 60a and 60b are adjusted to provide identical linear sawtooth outputs of the sawtooth generator circuits 6a and 6b.

The base electrode circuit of the transistor 50a is completed by a resistor 62a connected to the base electrode 52a in series with a rectifier 64a connected to the positive voltage bus 43. A capacitor 65a is connected between the juncture of the rectifier 64a and resistor 62a, and a line 67a which connects the upper end of the pulse transformer winding 48a to the emitter electrode 66a. The emitter electrode of transistor 50a is connected to ground through a resistor 68a. The ungrounded end of the resistor 68a is the output point of the sawtooth generator circuit connected by the line 67a to the base electrode circuit of the comparator circuit transistor 30a.

The collector electrode 73a of the transistor 50a is connected to the positive voltage bus 33 through a resistor 74a. It is apparent that when the capacitors 54a and 56a are allowed to charge through the rectifier 64a and the resistor 62a that the voltage applied to the base electrode 52a will progressively increase during the charging of the capacitor and the resulting voltage waveform will appear across the resistor 68a. The charging of these capacitors terminate when a discharge circuit is established in parallel therewith. This discharge circuit includes a rectifier 76a connected to the base electrode side of the capacitor 57a and one end of a resistor 84a whose opposite end is grounded. The ungrounded end of the resistor 84a is connected to the emitter electrode 82a of a transistor 80 forming part of generator control circuit 8a. (The generator control circuit 8b associated with the sawtooth generator circuit 6b is identical to the generator control circuit 8a now to be described. Similar elements of these circuits have thus been similarly numbered with the reference characters *a* and *b* respectively being associated with the circuits 8a and 8b.)

The collector electrode of the transistor 85a is connected through a resistor 86a to the positive voltage bus 83. When transistor 80a is conducting heavily, a relatively high positive potential will appear on the emitter electrode 82a. The associated diode 76a has its cathode connected to the emitter electrode 82a so that the rectifier will be in a non-conductive state to prevent discharge of the sawtooth generator capacitors 54a and 56a so long as the voltage on the emitter electrode 82a is more positive than the voltage to which the capacitors are charged at any instant. The time constant of the capacitor charge circuit is such that this condition is never reached while the transistor 80a is highly conductive. When this transistor is rendered non-conductive, the voltage and emitter electrode 82a is at ground potential which results in the conduction of the diode 76a and the fast discharge of the capacitors 54a and 56a.

The conduction of the transistor 80a is controlled from the output 7a of the bistable circuit 2. This output 7a, as previously indicated, has a relatively high positive potential when the bistable circuit is in a set condition at a relatively low or ground potential when the bistable circuit is in a reset condition. The output 7a extends to the base electrode 87a of the transistor 80a. Accordingly, when the bistable circuit 2 is in a set condition, the transistor 80a will be in a highly conductive condition thereby permitting the sawtooth generator 6a to generate a progressively increasing voltage. When the bistable circuit is reset, ground potential appears at the output 7a which results in the non-conduction of the transistor 80a and the rapid discharge of the capacitors 54a and 56a.

The base electrode 87b of the transistor 80b of the generator control circuit 8b is connected to the output 7b of the bistable circuit 2 which is 180° out of phase with the voltage at the bistable circuit 7a. Accordingly, when the bistable circuit 2 is in a set condition, ground potential will be present at the output 7b rendering the transistor 80b non-conductive to enable rapid discharge of the capacitors 54b and 56b of the sawtooth generator circuit 6b. When the bistable circuit 2 is reset, the high positive potential appearing at the output 7b will render the transistor 80b conductive to permit capacitors 54b and 56b to charge the positive potential of the direct current voltage source 44.

The bistable circuit 2 is shown as including a pair of transistors 95a and 95b associated with various capacitor and resistance elements to form a more or less conventional transistor bistable circuit whose operation is well known and need not be described in detail. It is sufficient to say that these transistors are always in an opposite state of conduction and the collector electrodes 96a and 96b of the transistors 95a and 95b are respectively at a high positive potential and ground when the bistable circuit is in a set condition, and respectively at ground and a high positive potential when a bistable circuit is in a reset condition. The collector electrodes 96a and 96b of the bistable transistors 95a and 95b are respectively connected to the output points 7a and 7b of the bistable circuit. Also, the collector electrodes 96a and 96b are respectively connected to feedback capacitors and resistor networks 97a and 97b which, in turn, are connected to the base electrodes 98b and 98a of the opposite transistors 95a and 95b. A negative pulse fed to the output points 7a or 7b will be coupled respectively through the associated feedback networks 97a and 97b to the base electrodes of the opposite transistors 95b and 95a to render the same non-conductive if already in a conductive state. The bistable circuit is set and reset in this manner. To this end, a diode 99a in series with a capacitor 100a is connected between the output line 7a and the collector electrode end of the pulse transformer winding 40a of the pulse transformer 31a forming part of the comparator circuit 10-1.

In a manner to be explained, the comparator circuit 10-1 forms a blocking oscillator type circuit which generates a single negative pulse when the associated transistor 30a is rendered conductive, which pulse is coupled by the capacitor 100a and the diode 99a to the output 7a of the bistable circuit to reset the same.

A similar circuit is provided for setting the bistable circuit comprising a diode 99b in series with a capacitor 100b connected to the collector electrode end of the pulse transformer winding 40b associated with the transistor 30b of the comparator circuit 10-2. When the transistor 30b is rendered conductive, a negative pulse is generated which is coupled through the capacitor 100b and diode 99b to the output 7b of the bistable circuit to set the same.

The transistors 30a and 30b of the comparator circuits 10-1 and 10-2 become conductive whenever the diodes 46a and 46b in the base circuits thereof are rendered conductive to cause base current to flow. The base emitter electrode circuits of these transistors include the input direct current voltage developed across the input capacitors 33a and 33b, and the sawtooth output of the sawtooth generator circuits 6a and 6b connected in opposition. When a sawtooth voltage is greater the voltage across the associated input capacitor 33a or 33b, the diodes 46a or 46b will conduct resulting in base current which initiates the triggering of the blocking oscillator circuit involved for a single pulsation period which is terminated by the damping diodes 45a or 45b. The blocking oscillator circuits 10-1 and 10-2 are triggered alternately since only one of the sawtooth generator circuits 6a and 6b is operative at any time.

The generator control circuit 8a coupled to the output 7a of the bistable circuit 2 forms an emitter follower circuit so that the same square wave output of the bistable circuit also appears across resistor 84a. An output line 104 extends from the ungrounded end of the resistor 84a to the aforementioned integrator circuit 18 which provides a direct current voltage which is equal to the average value of the square wave voltage across the resistor 84a. This integrator circuit includes a resistor 18-1 wave potential to ground. A resistor 18-3 is connected between the juncture of the diode 18-2 and resistor 18-1, and one plate of a filter capacitor 18-4 whose opposite plate is grounded. A resistor 18-5 and filter capacitor 18-6 are connected across the capacitor 18-4 to further filter the signal. The voltage across the latter capacitor 18-6 is connected to the upper end of the potentiometer 20 whose bottom end is connected to the negative terminal of the voltage source 22.

For reasons explained above, it is apparent that the average value of the output 7a of the bistable circuit 2 is a measure of the ratio of the two input voltages applied across the input capacitors 33a and 33b. As previously indicated, these voltages are respectively proportional to the voltages E1' and 2E2'—E1' in the exemplary quotient circuit illustrated in FIGS. 3 and 4. Accordingly, when the voltages E1' and E2' are equal, the set and reset intervals of the bistable circuit 2 will be equal. As will appear, it is desirable in many instances, particularly in the flowmeter application of the invention to be described, to provide a zero output when the voltages E2' and E1' are equal. This is accomplished by adjustment of the potentiometer wiper 20a. Then, the output will be positive if $E1'>E2'$, and negative if $E1'<E2'$.

Refer now to FIG. 5 which shows the important application of the present invention in a flowmeter generally indicated by reference numeral 105. The flowmeter measures the magnitude and direction of fluid flow in a conduit 107 through which fluid may flow in a direction indicated by an arrow 109 or the direction indicated by an arrow 110. A piezo-electric transmitting transducer element 112 is mounted on the outside of the conduit 107 to transmit vibrations through the walls of the conduit and into the stream flowing through the conduit. The transducer element 112 produces a beam pattern P directed transversely across the conduit. The transmitting transducer element 112 is excited by a transmitter circuit 113 which operates to cause the transmitting transducer element 112 to emit ultrasonic vibrations.

A pair of piezo-electric receiving transducer elements 114 and 116 are respectively mounted on the conduit 107 on the side thereof diametrically opposite the side on which the transmitting transducer element 112 is mounted. The receiving transducer elements 114 and 116 are positioned to intercept oppositely sloping linear drop-off segments of the beam pattern P, and under no flow conditions are centered on the segments to produce equal outputs in the receiving transducer elements 114 and 116. Receiver circuits 118 and 120 are respectively connected to the outputs of the receiving transducer elements 114 and 116 and produce direct current outputs E2' and E1' respectively. The outputs E2' and E1' of the receiver circuits 118 and 120 are coupled to input terminals 17 and 19 which are the correspondingly identified input terminals of the divider circuit shown in FIG. 3. It has been discovered that the fluid flow in the conduit is a function of the ratio of the magnitudes of the signals received by the two receiving transducer elements so that the output of the divider circuit of the invention is a measure of the fluid flow and the direction thereof.

When fluid flows through the conduit 107 in the direction indicated by the arrow 109, the beam pattern P will be shifted toward the right hand receiving transducer element 116 relative to the no flow position thereof, so that the latter will intercept a stronger signal and the left hand receiving transducer 114 will intercept a weaker signal. Conversely, when the fluid flows in the conduit 107 in the direction indicated by the arrow 110, the beam pattern will shift toward the left relative to the no flow position thereof so that the signal intercepted by the receiving transducer element 114 will be stronger and the receiving transducer intercepted by the receiving transducer element 116 will be weaker.

If the wiper 20a of the potentiometer 20 (FIG. 3) in the quotient circuit of the invention is adjusted to provide a zero output in the no flow conditions of the fluid in the conduit 107, then the voltage output of the divider circuit will accordingly indicate fluid flow in the direction 109 by the magnitude of a voltage of one polarity, and fluid flow in the direction 110 by the magnitude of a voltage of opposite polarity.

It should be understood that numerous modifications may be made of the preferred form of the invention above described without deviating from the broader aspects of the present invention.

What I claim as new and desire to protect by Letters Patent of the United States is:

1. An electrical divider circuit for providing a direct current output voltage whose amplitude is proportional to the ratio of a first to a second direct current voltage, said first and second voltages respectively having magnitudes E1 and E2 where $E2>E1$, said divider circuit comprising: square wave generating means for continuously alternately generating output voltages at two fixed predetermined levels which are not of dissimilar polarities, means for operating said square wave generating means alternately between said two fixed predetermined levels and including time control means for operating said square wave generating means at the higher of said levels for a duration proportional to the amplitude E1, the smaller of said voltages, and at the lower of said levels for a duration proportional to the difference between the two voltages, and means for providing an output direct current voltage proportional to the average of the envelope of the resultant output voltage waveform of said square wave generating means.

2. An electrical divider circuit for providing a direct current output voltage whose amplitude is proportional to the ratio of a first to a second direct current voltage, said first and second voltages respectively having magnitudes E1' and E2' which may vary over a range of values including the condition where both input voltages are of similar magnitudes, said divider circuit comprising: square wave generating means for continuously alternately generating output voltages at two fixed predetermined levels which are not of dissimilar polarities, means for operating said square wave generating means alternately between said two fixed predetermined levels and including time control means for operating said square wave generating means at the high of said levels for a duration proportional to the amplitude E1' and at the lower of said levels for a duration proportional to $K1\times E2'-K2\times E1'$, where K1/K2 is at least 2, and means for providing an output direct current voltage proportional to the average of the envelope of the resultant output voltage waveform of said square wave generating means.

3. An electrical divider circuit for providing a direct current output voltage whose amplitude is proportional to the ratio of a first to a second direct current voltage, said first and second voltages respectively having magnitudes E1' and E2' which may vary over a range of values including the condition where both input voltages are of similar magnitudes, said divider circuit comprising: square wave generating means for continuously alternately generating output voltages at two fixed predetermined levels which are not of dissimilar polarities, means for operating said square wave generating means alternately between said two fixed predetermined levels and including time control means for operating said square wave generating means at the higher of said levels for a duration proportional to the amplitude E1', and at the lower of said levels for a duration proportional to $$K1 \times E2' - K2 \times E1'$$

where $K1/K2$ is 2, and means for providing an output direct current voltage proportional to the average of the envelope of the resultant output voltage waveform of said square wave generating means.

4. An electrical divider circuit for providing a direct current output voltage whose amplitude is proportional to the ratio of a first to a second direct current voltage, said first and second input voltages respectively having magnitudes E1 and E2 which are not of dissimilar polarities, said divider circuit comprising: bistable circuit means having an output at which appears a signal having a first relatively high direct current voltage level when the circuit means is in a first state of operation and a second relatively low direct current voltage level when the circuit means is in a second state of operation, bistable control means for continuously alternately operating said bistable circuit means in said first and second states of operation to provide a square wave signal at said output, said control means including means for effecting operation of said bistable circuit means in said first state of operation for a duration proportional to the value of said first input voltage and for effecting operation of said bistable circuit means in said second state of operation for a duration proportional to the difference between said second input voltage and said first input voltage, and means for providing an output direct current voltage proportional to the average of the envelope of the square wave output of said bistable circuit means.

5. An electrical divider circuit comprising: a continuously operating square wave generator circuit having a first condition when the output thereof is at a first relatively high direct current voltage level and a second condition where the output thereof is at a second relatively low direct current voltage level, sawtooth wave generating means for repeatedly generating a substantially linear sawtooth voltage output waveform of progressively increasing magnitude, control means for synchronizing said sawtooth wave generating means with the operation of said square wave generator circuit, a first pair of main signal input terminals to which direct current input voltages to be divided are fed, amplitude comparator circuit means responsive to the output of said sawtooth wave generating means and to the input voltages on said signal input terminals for operating said square wave generator circuit in said first condition for a duration proportional to the smaller of the last mentioned voltages and in said second condition for a duration proportional to the difference between the last mentioned voltages and means responsive to the average value of the square wave output of said square wave generating circuit.

6. An electrical divider circuit comprising: a continuously operating square wave generator circuit having a first condition when the output thereof is at a first relatively high direct current voltage level and a second condition where the output thereof is at a second relatively low direct current voltage level, sawtooth wave generating means for repeatedly generating a substantially linear sawtooth voltage output waveform of progressively increasing magnitude, control means for synchronizing said sawtooth wave generating means with the operation of said square wave generator circuit, a first pair of main signal input terminals to which direct current input voltages to be divided are fed, voltage modifying means connected in series with one of said main signal input terminals for providing in the output thereof a modified input voltage bearing a definite ratio to the input voltage thereto wherein the modified voltage always is substantially greater or smaller than the input voltage to be fed to the other main signal input terminal for the expected voltages, amplitude comparator circuit means responsive to the output of said sawtooth wave generating means and to the output voltage of said voltage modifying means and the voltage on said other signal input terminal for operating said square wave generator circuit in said first condition for a duration proportional to the smaller of the last mentioned voltages, and in said second condition for a duration proportional to the difference between the last mentioned voltages and means responsive to the average value of the square wave output of said square wave generating circuit.

7. An electrical divider circuit comprising: a continuously operating square wave generator circuit having a first condition when the output thereof is at a first relatively high direct current voltage level and a second condition where the output thereof is at a second relatively low direct current voltage level, sawtooth wave generating means for repeatedly generating a substantially linear sawtooth voltage output waveform of progressively increasing magnitude, control means for synchronizing said sawtooth wave generating means with the operation of said square wave generator circuit to said first and second conditions whereby a new sawtooth waveform is generated as the square wave generator circuit changes condition, a first pair of main signal input terminals to which direct current voltages to be divided are fed, subtracting means coupled to said terminals for providing a direct current voltage proportional to the difference between said voltages, amplitude comparator circuit means responsive to the smaller of said voltages to be divided and the sawtooth output of said sawtooth wave generating means which is synchronized with the start of the first condition of the square wave generator circuit for operating said square wave generator circuit in said second condition when a given state of comparison exists between the latter voltages, and responsive to the output of said subtracting means and the sawtooth output of said sawtooth wave generating means synchronized with the start of the second condition of the square wave generator circuit for operating said square wave generating circuit in said first condition when a given state of comparison exists between the latter voltages, and means for providing a voltage proportional to the average value of the square wave voltage waveform of said square wave generator circuit.

References Cited by the Examiner
UNITED STATES PATENTS

| | | | |
|---|---|---|---|
| 2,666,576 | 1/54 | Hirsch | 235—193 |
| 2,773,641 | 12/56 | Baum | 235—194 |
| 2,966,306 | 12/60 | Isabeau | 235—194 |
| 2,969,915 | 1/61 | Collier et al. | 235—194 |
| 3,018,966 | 1/62 | Zelina | 235—195 |
| 3,019,982 | 2/62 | Follin | 235—194 |
| 3,043,516 | 7/62 | Abbott et al. | 235—193 X |

MALCOLM A. MORRISON, *Primary Examiner.*